United States Patent [19]

Merriss

[11] 4,451,021
[45] May 29, 1984

[54] REAR VIEW MIRROR EXTENSION ASSEMBLY

[76] Inventor: Charles E. Merriss, 10838 S. Cullman Ave., Whittier, Calif. 90603

[21] Appl. No.: 356,025

[22] Filed: Mar. 8, 1982

[51] Int. Cl.³ .............................................. B60R 1/06
[52] U.S. Cl. .................................................... 248/480
[58] Field of Search ........... 248/480, 476, 477, 475 R; 350/304, 279, 280

[56] References Cited

U.S. PATENT DOCUMENTS

| | | | |
|---|---|---|---|
| 1,840,248 | 1/1932 | Oishei | 248/480 |
| 1,918,802 | 7/1933 | Fleischer | 248/480 |
| 2,520,365 | 8/1950 | Hopper | 248/480 |
| 3,228,643 | 1/1966 | Shilling | 248/480 |
| 4,227,671 | 10/1980 | Bourassa | 248/480 |

FOREIGN PATENT DOCUMENTS

| | | | |
|---|---|---|---|
| 2403570 | 8/1974 | Fed. Rep. of Germany | 248/480 |
| 462050 | 2/1951 | Italy | 350/304 |

Primary Examiner—Reinaldo P. Machado
Assistant Examiner—Alvin Chin-Shue
Attorney, Agent, or Firm—William C. Babcock

[57] ABSTRACT

A rear view mirror extension assembly that may be used in conjunction with the mirror support bracket on an automotive vehicle such as a pick-up truck, van or the like, and it is particularly useful when the vehicle is towing a travel trailer or boat to improve the field of vision for the driver of the vehicle rearwardly of the latter. The improved field of vision is desirable and increases the safety in driving a vehicle equipped with the invention on the highway, as well as permitting easier maneuvering of the vehicle drawing a trailer or boat into a recreational vehicle parking space.

3 Claims, 5 Drawing Figures

REAR VIEW MIRROR EXTENSION ASSEMBLY

DESCRIPTION OF THE PRIOR ART

Modern day pick-up trucks, vans and other automotive vehicles that pull trailers or boats, are unusually large or long, are equipped with rear view mirrors on both sides for the benefit of the driver. Although the rear view mirrors are supported on brackets that extend outwardly from the vehicle a substantial distance, this outward positioning of the rear view mirrors is not sufficient in many instances to permit a clear unobstructed view rearwardly of the vehicle.

A major object of the present invention is to provide an assembly that is used in conjunction with a rear view mirror support after the mirror has been removed therefrom to longitudinally and adjustably support the mirror at an increased outward position relative to the bracket to improve and increase the field of vision for the driver rearwardly of the vehicle.

Another object of the invention is to supply a rear view mirror assembly that increases the safety in driving the vehicle on the highway, and in addition permits the vehicles to be manoeuvred more easily into a recreational vehicle parking space, particularly if the vehicle is being utilized to draw a trailer, boat or the like.

A still further object of the invention is to supply an assembly that not only positions the rear view mirrors on the drivers side a greater distance outwardly from the vehicle, but the invention also capable of being used to similarly position the rear view mirror on the passenger side in a like outward position relative to the vehicle.

These and other objects and advantages of the invention will become apparent from the following description of a preferred and alternate form thereof.

SUMMARY OF THE INVENTION

The invention is used in combination with an automotive vehicle having a bracket extending outwardly therefrom that includes an upper horizontal portion in which a transverse opening is formed through which a screw extends upwardly to engage a tapped bore in a post of a rear view mirror to support the mirror from the bracket.

The invention adjustably supports the same rear view mirror a greater distance outwardly from the bracket, and this outward distance being adjustable to a desired distance by the driver. The assembly includes an elongate rigid member that has first and second ends, a transverse bore that is adjacent the first end and through which a screw extends upwardly to engage the tapped bore in the post to support the mirror from the elongate member. The elongate member has an elongate slot therein that is intermediately disposed between the transverse bore and the second end.

A bolt that includes a head, has the shank that extends downwardly therefrom pass through the slot to have a portion of the shank situated below the elongate member, and this portion having external threads formed thereon. The threaded portion of the shank is engaged by a nut.

A number of washers are provided that have the shank extending therethrough and are in contact with the elongate rigid member and the bracket, with the slot permitting the rigid member and mirror to be moved longitudinally relative to the bracket to improve the field of vision in the mirror relative to that obtainable when the mirror is mounted on the bracket in a conventional manner. The elongate member and mirror are maintained in a desired longitudinally adjusted position by moving the elongate member relative to the bracket, and the nut being tightened on the bolt to compress the washers when the rear view mirror is in a desired outwardly disposed and adjusted position, with the compressed washers frictionally engaging the head and nut of the bolt and the upper and lower surfaces of the elongate members and horizontal portion of the bracket.

DESCRIPTION OF THE INVENTION

Figure 1:
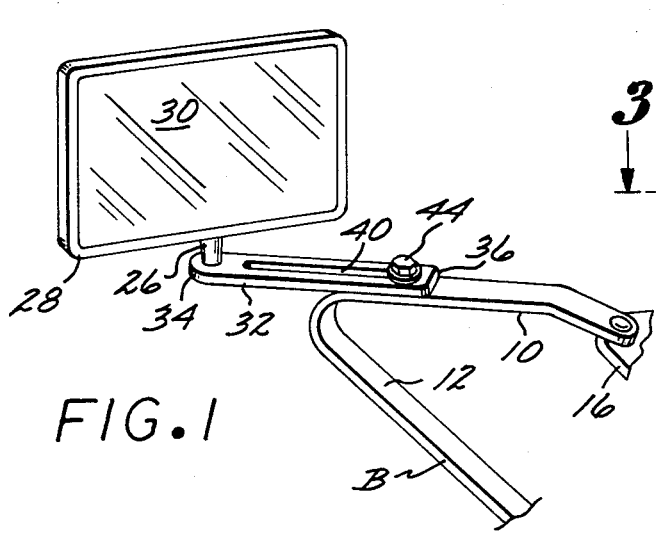
FIG. 1 is a perspective view of a conventional rear view mirror supporting bracket secured to an automotive vehicle, with the rear view mirror having been removed from the bracket, and the mirror after removed mounted on the invention which is adjustably supported from the bracket.
Figure 2:
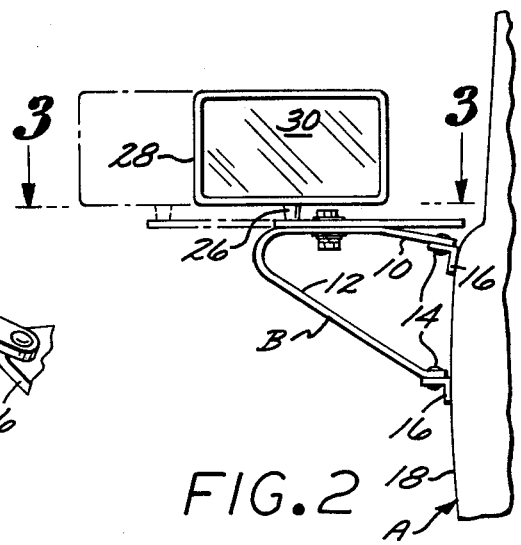
FIG. 2 is a side elevational view of the assembly supported rear view mirror, with the position of the mirror when inwardly disposed relative to the drivers side of the vehicle being shown in solid line and when outwardly disposed being illustrated in phantom line, and a like assembly capable of being supported from the passenger side of the vehicle.
Figure 3:
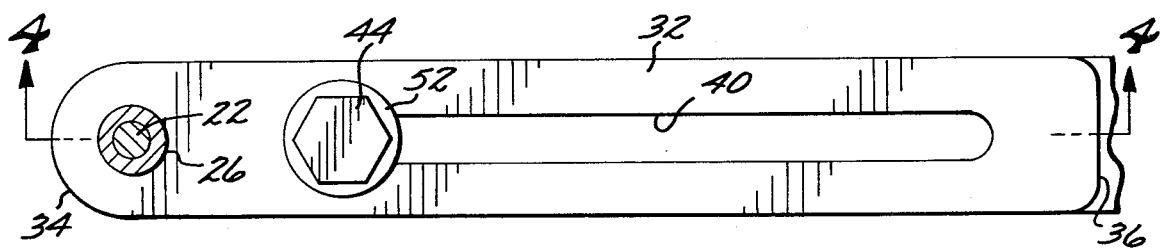
FIG. 3 is a top plan view of the rear view mirror supporting assembly taken on the line 3—3 of FIG. 2.

In FIG. 2 a drivers side portion of an automotive vehicle A is shown that has a rear view mirror bracket B projecting outwardly therefrom that is used by the driver of the vehicle, with the bracket including a horizontal portion 10 and a downwardly and inwardly extending portion 12. The portions 10 and 12 are by rivets 14 or other suitable fastening means secured to vertically aligned and spaced clips 16 secured to the exterior surface of the body 18 that forms a part of the vehicle.

Figure 4:
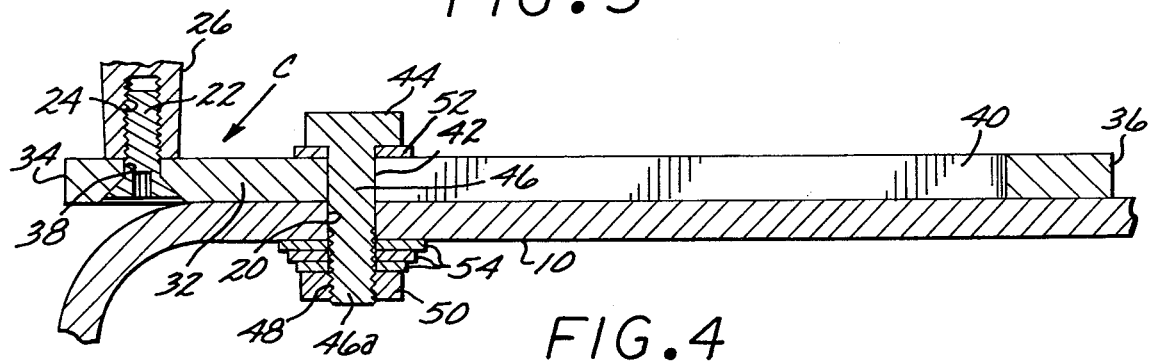
FIG. 4 is a longitudinal cross sectional view of the assembly taken on the line 4—4 of FIG. 3.

The horizontal portion 10 of the bracket B as may be seen in FIG. 4 includes a transverse opening 20 through which a screw 22 would normally extend upwardly to engage a tapped recess 24 in a post 26 that support a rectangular frame 28 in which a rear view mirror 30 is mounted.

However, when the present invention C is utilized, the screw 22 is removed from the opening 20 to permit the mirror supporting post 26 to be disengaged from the bracket B.

The adjustable extension assembly C as best seen in FIG. 4 includes an elongate rigid member 32 that has a first outwardly disposed end 34 and a second end 36 that is situated inwardly adjacent the vehicle A. The elongate member 32 has an elongate longitudinally extending slot 40 defined therein that is intermediately positioned between a transverse bore 38 located adjacent the first end 34, and the second end 36.

A bolt 42 is provided that has a head 44 as shown in FIG. 4, with the head having a shank 46 extending downwardly therefrom. The shank 46 includes a lower portion 46a on which external threads 48 are defined. The shank 46 as shown in FIG. 4 extends downwardly through the slot 40 and the opening 20. The threads 48 are engaged by a nut 50. A first washer 52 rests on the upper surface of the elongate member 32 and contacts the under surface of the bolt head 44. Second washers 54 are mounted on the shank 46 and are situated between the nut 50 and the underside of the horizontal portion 10 of the bracket B.

By tightening the nut 50, the washers 52 and 54 are compressed and frictionally engage the elongate member 32 and bracket portion 10 to the extent that the elongate member 32 will remain in a fixed longitudinally adjusted position thereon. In FIG. 2 it will be seen that the elongate rigid member 32 and the mirror 30 supported therefrom have been moved inwardly towards the vehicle A a maximum distance, and may be held in this position by tightening the nut 50. When it is desired to move the mirror 30 outwardly to the position shown in phantom line in FIG. 2, the nut 50 is loosened to permit the elongate member 32 to slide relative to the bolt 42. After the elongate member 32 and mirrors 30 have been moved outwardly to the maximum position as shown in phantom line in FIG. 2, the nut 50 is tightened to hold the elongate member in this adjusted position by compressing the washer 52 into frictional engagement with the head 44 and elongate member 32, and the washers 54 into frictional engagement with the bracket portion 10 and nut 50.

Due to the manner in which the elongate member 32 is adjustably supported on the bracket portion 10 by the bolt 42, the elongate member 32 may not only be adjusted longitudinally relative to the bracket portion 10 but pivotally as well.

When the vehicle is moving through a narrow passage, such as an entrance into a garage or like confined space, the mirrors 30 may be moved inwardly from the position shown in phantom line in FIG. 2, so that illustrated in solid line in the same figure. In most instances, the automotive vehicle A will not only have a bracket on the drivers side but also the passenger side (not shown) and both these brackets supporting one of the inventions as illustrated in FIGS. 2 and 4.

Figure 5:
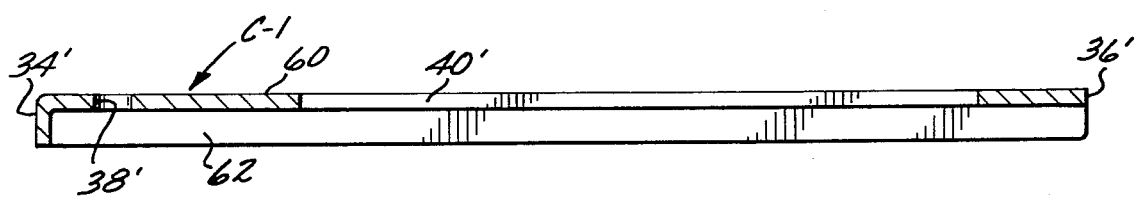
FIG. 5 is a longitudinal cross sectional view of an alternate form of the elongate member used in the assembly.

An alternate form C-1 of the invention is shown in FIG. 5. The form C of the invention preferably has the elongate member 32 formed from a rigid bar of aluminum or an alloy thereof that is resistant to corrosion when exposed to the weather. The alternate form C-1 is formed from sheet material by conventional means such as a stamping operation or the like. Both the forms C and C-1 serve the same function and are used in the same manner. Elements of the alternate form C-1 that are common to the form C are identified by the same numerals previously used with form C but with primes being added thereto.

In the alternate form C-1, an elongate metal sheet 60 is provided that has a continuous flange 62 extending downwardly from the longitudinal side edges thereof and from the first end 34' to reinforce sheet 60 and prevent it from deforming due to the weight of the post 26, frame 28 and rear view mirror 30 supported therefrom. The flanges 62 that project downwardly from the elongate sheet 60 are laterally spaced a sufficient distance as to extend downwardly over the bracket portion 10.

The use and operation of the first and alternate forms C and C-1 of the invention have previously been described in detail and need not be repeated.

What is claimed is:

1. In an automotive vehicle having a bracket extending outwardly therefrom that includes an upper horizontal portion in which a transverse opening is formed through which a screw extends upwardly to engage a tapped bore extending downwardly in a post of a rear view mirror to support said mirror from said bracket, the combination with said bracket after said mirror and screw have been removed therefrom of an assembly for adjustably supporting said mirror outwardly from said vehicle a greater distance than when mounted on said bracket, said assembly including:
    a. an elongate rigid adaptor member that has first and second ends, and resting on said upper horizontal portion, a transverse bore adjacent said first end through which said screw extends upwardly to engage said tapped bore in said post to support said mirror from said member, and an elongate slot in said member intermediately disposed between said transverse bore and said second end;
    b. a bolt that includes a head, and a shank that extends downwardly therefrom through said slot to have a portion of said shank situated there-below, said portion having external threads thereon;
    c. a nut that engages said threads; and
    d. a plurality of washers that have said shank extending therethrough and that are in contact with said elongate rigid member and said bracket, with said slot permitting said rigid member and mirror to be moved longitudinally relative to said bracket to improve the field of vision visible in the mirror relative to that obtainable when the mirror is mounted on said bracket, and said elongate member and mirror being maintained in the position to which they are adjusted by tightening said nut to compress said washers and force them into frictional engagement with said head and nut and said bracket and elongate member.

2. An assembly as defined in claim 1, in which said elongate member is a bar formed from a metal that is resistant to corrosion from the weather, with said bar being pivotally, as well as longitudinally, adjustable relative to said bracket.

3. An assembly as defined in claim 1, in which said elongate member is formed from a weather resistant sheet, said elongate member having side edges and a convex curved outer end, and said side edges and curved outer end developing into a continuous normally disposed flange that serves to reinforce said sheet from deformation due to the weight of said mirror supported therefrom, with said flange extending downwardly over said horizontal portion of said bracket.

* * * * *